324-77.

OR  3,571,705

[11] 3,571,705

| [72] | Inventors | Bruce A. Crane<br>Wethersfield;<br>William H. Walter, Granby, Conn. |
| [21] | Appl. No. | 782,198 |
| [22] | Filed | Dec. 9, 1968 |
| [45] | Patented | Mar. 23, 1971 |
| [73] | Assignee | United Aircraft Corporation<br>East Hartford, Conn. |

[54] ANALOG SIGNAL AMPLITUDE DISTRIBUTION MEASURING APPARATUS
2 Claims, 4 Drawing Figs.

[52] U.S. Cl. .................................................. 324/77, 73/146
[51] Int. Cl. ............................................... G01r 19/04
[50] Field of Search ......................................... 73/516, 517, 146, 67, 71.4, 71.2; 324/77 (A); 235/92 (29A), 92 (50)

[56] References Cited
UNITED STATES PATENTS
| 2,996,912 | 8/1961 | Shailor | 73/71.4 |
| 3,125,721 | 3/1964 | Schumann | 324/77(A)X |
| 3,151,235 | 9/1964 | Greenshields | 235/92(29A) |

*Primary Examiner*—James J. Gill
*Attorney*—Melvin Pearson Williams

ABSTRACT: The time distribution of amplitudes of analogue signals, as well as the number of signals in excess of a given amplitude, are recorded in a plurality of electromechanical counters, each one corresponding to a range of amplitudes or a lower limit of amplitude. The amplitudes are determined by periodically comparing the analogue voltage wave form with a plurality of standard voltages, each corresponding to a boundary between the ranges of the various counters. Selectively engageable filtering is provided, and DC offset means is provided (such as for gravity compensation in an accelerometer embodiment).

FIG. 4
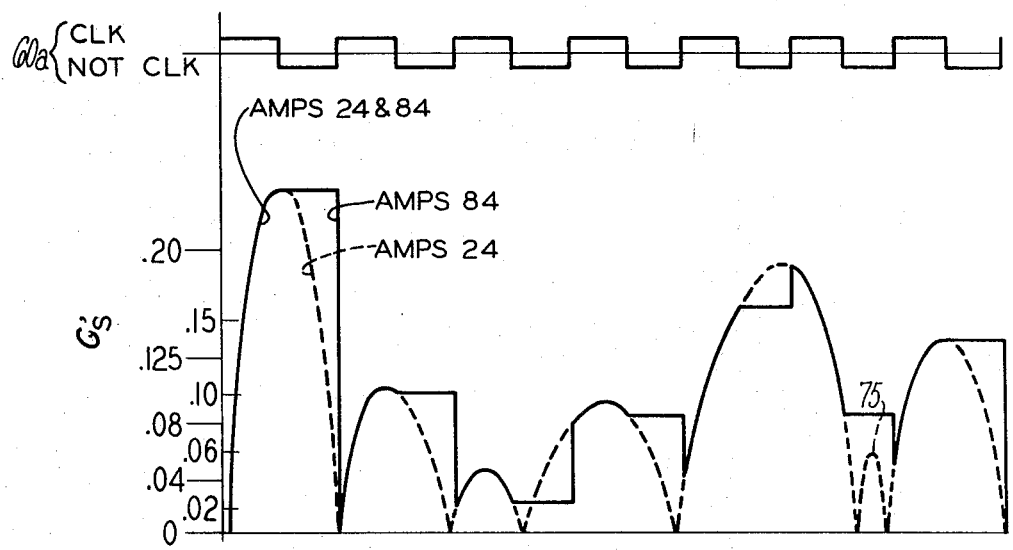
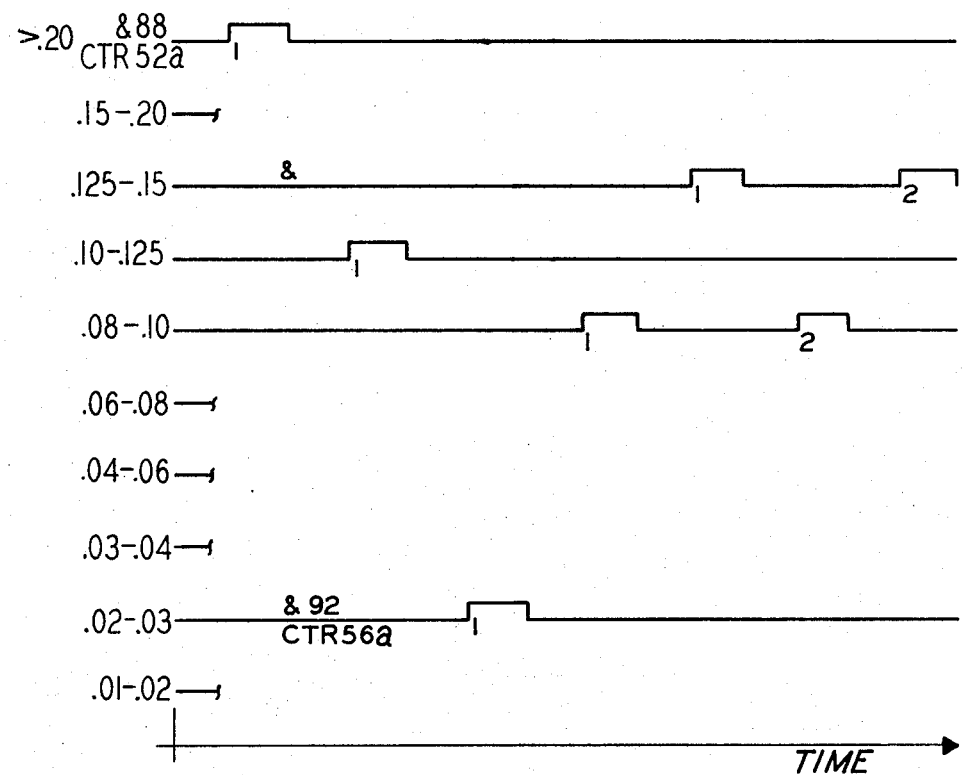

3,571,705

ANALOG SIGNAL AMPLITUDE DISTRIBUTION MEASURING APPARATUS

BACKGROUND OF THE INVENTION

1. Field of Invention

This invention relates to analogue voltage analysis, and more particularly to a device for either measuring a time distribution of a range of amplitudes or measuring the number of occurrences of amplitudes in excess of various magnitudes.

2. Description of the Prior Art

As an example of the need for the present invention, consider that recent advances in rail and other mass transportation equipment has made it highly desirable to determine the ride characteristics of the transportation apparatus, such as railroad cars. Heretofore, various methods of measuring the ride characteristics of the cars have been utilized. The most well known and widely used method is that of personal experience and opinion based on the subjective evaluation of a ride experienced by a passenger on the train. This however, is known to be inaccurate in terms of careful evaluation of modifications in order to establish trends in the movement of a train as a result of experimental improvements, or in terms of comparison between railroad cars, sections of the road, and so forth. In all of these cases, a much more accurate method is required.

One form of mechanical ride evaluating apparatus known to the art involves a plurality of transducers such as proximity measuring devices, strain gauges and potentiometers located in such a fashion as to measure stresses and distances between various portions of a train such as between structural members, between the truck and body of the train, or between various cars of a train. Information obtained thereby has heretofore, however, been absolutely useless until it has been transcribed and analyzed, and is therefore of no value in immediate evaluation of operating conditions on the site. A different type of ride quality measuring apparatus involves the use of inertial devices, the acceleration of a railroad car causing a displacement of the inertial device such that when the magnitude of displacement is sufficient to close a contact, then a related counter will register. These inertial devices, however, in effect measure the magnitude of the third derivative of displacement with respect to time which is shock or jolt rather than acceleration (the second derivative of displacement). In addition, such inertial devices necessarily record all events higher than a given magnitude, so that the measuring of events up to a given magnitude can be done only by subtracting from the recorded readings or events of higher magnitude. Thus, direct reading is not possible with such devices.

A further improvement has been the utilization of accelerometers mounted in various places on the train and recording the accelerometer output on magnetic tape. The tape is then taken to a central processing area and processed so as to provide charts of outputs of the various accelerometers for comparison and analysis. This, however, is costly and has the same problem of not being immediately available for analysis on the site where the measurements are being taken. Thus, analysis of variations and technical changes made, cannot be made immediately and therefore hinders the process of high-speed transportation developments.

All of the aforementioned mechanical methods of measuring ride qualities are cumbersome, complex and expensive. However, in order to accurately analyze ride qualities, which are necessarily originated in an analogue fashion, a digital analysis of analogue voltages, heretofore unobtainable in the art, is required.

As another example of a field wherein the present invention may find advantageous utilization, consider the compiling of data relating to evaluation of inertial components such as gyroscopes, more specifically the evaluation of wheel power variations, heretofore, the most common form of analysis has been to provide multitrack graphic representations of a plurality of the aforementioned parameters, and then have an analyst review, step-by-step along the graph, all of these recorded parameters and provide digital approximations of the parameters in a form useful in the analysis of the indications or conclusions which may be derived or drawn therefrom.

SUMMARY OF THE INVENTION

The object of the present invention is to provide for the contemporaneous digital presentation of indications of the amplitude variations in an analogue voltage.

According to the present invention, an analogue voltage, such as may be derived from a transducer, indicative of a monitored parameter is periodically sampled with respect to a plurality of voltage references, and the results of the sampling are recorded in counters. In accordance with the invention in one form, the time distribution of amplitudes, which fall within various ranges of amplitude, are recorded in response to digital logic which in turn is responsive to voltage comparators indicative of the limits of ranges to which each of the counters relate. In accordance with the invention in another form, the occurrence of amplitudes of the analogue voltage in excess of given magnitudes is recorded in counters in response to the voltage references. In accordance with the invention in both forms, indications both of distributions of amplitude ranges and occurrences of amplitudes in excess of given amounts may be contemporaneously analyzed with respect to the counts registered in two sets of counters.

In accordance still further with the present invention, provision is made to utilize relatively inexpensive mechanical accumulators for counting the indicia derived by the present invention in cases where the character of the analogue voltage being monitored does not require high-speed electronic components.

A specific object of the present invention in one form is to provide an instantaneously and directly readable apparatus for measuring ride qualities; another specific object is to provide an apparatus for measuring ride qualities which is capable of implementation at relatively low cost and in a portable form, so as to facilitate usage on the site; a further specific object is to provide apparatus for measuring ride qualities which can be utilized by relatively unskilled persons.

According to a specific embodiment of the present invention, various distinct ranges of acceleration magnitudes sensed by an accelerometer are separately and independently recorded in corresponding registers or counters; the counts provided are an indication of the number of times during the data collection period that an acceleration amplitude of a given amount corresponding to each counter has been experienced. In further accord with the present invention, the output of a single accelerometer is compared against a plurality of reference voltages, each reference voltage corresponding to the limits of a given range of acceleration magnitudes, each range corresponding to a respective counter which is responsive to the output of the related comparator. In accordance still further with the present invention, gravitational effects can be eliminated by introduction of an offset voltage to subtract from the system the accelerometer output relating to gravity, or by filtering means. The invention further provides readily adjustable limits on the ranges recorded, and selective limits on frequency response to the accelerometer output.

This invention provides a simple compact unit which can readily be carried aboard a vehicle, the ride quality of which is to be measured. It further provides, without any mathematical or other analysis, instantaneous indications of the number of times that acceleration amplitudes within given ranges or in excess of given magnitudes have been experienced during a given data collection period. The invention is also capable of implementation at relatively low cost using standard components in a lightweight and compact unit.

The foregoing and other objects, features and advantages of the present invention will become more apparent in the light of the following detailed description of preferred embodiments thereof, as illustrated in the accompanying drawing.

BRIEF DESCRIPTION OF THE DRAWING

FIG. 4 is a diagram illustrative of the operation of the embodiment of FIG. 3.

DESCRIPTION OF THE PREFERRED EMBODIMENT

Figure 1:
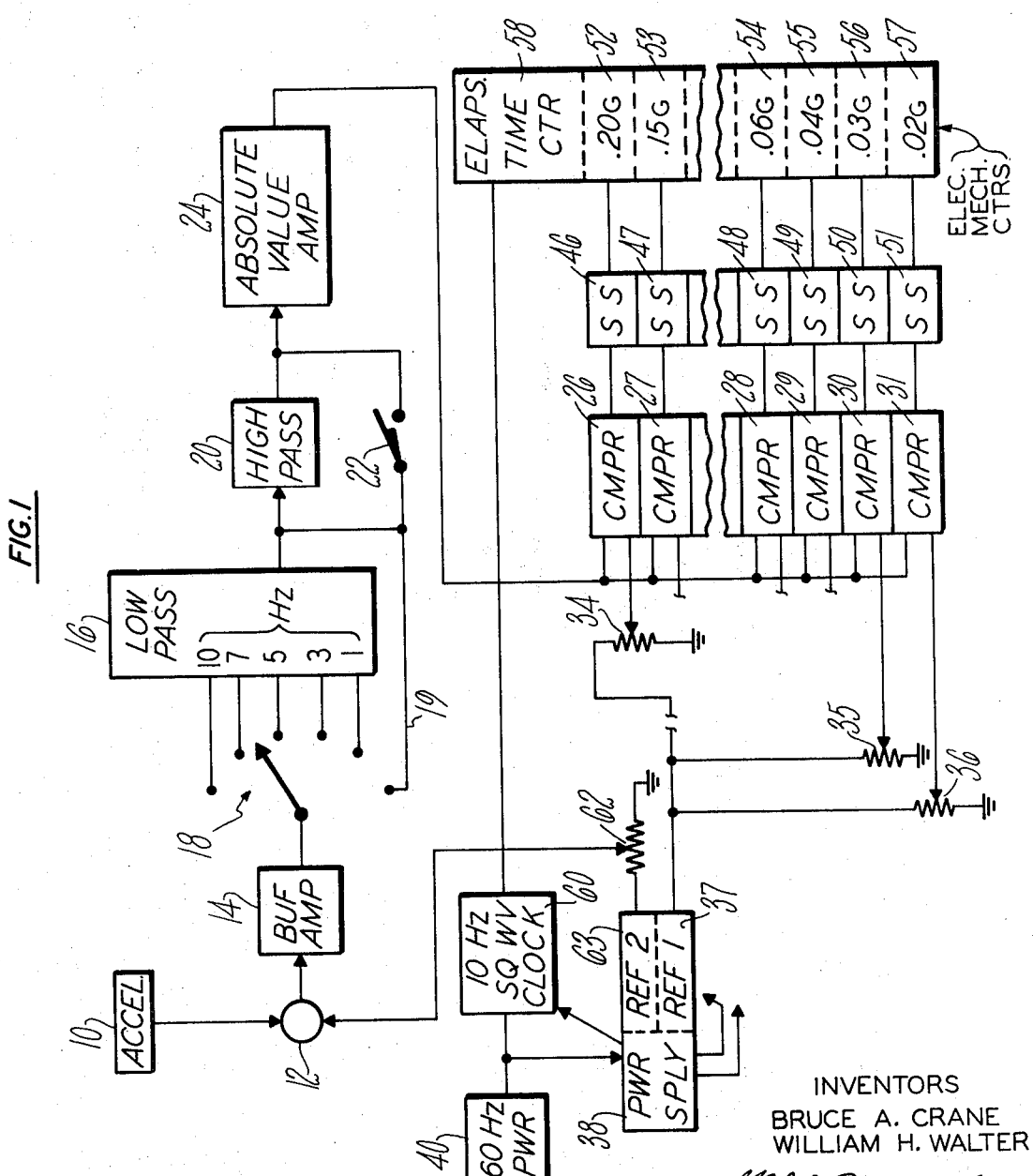
FIG. 1 is a schematic block diagram of a first embodiment of the present invention which counts amplitude of occurrences in excess of given amounts.

Referring now to FIG. 1, an analogue voltage waveform indicative (for example) of acceleration magnitudes in a given direction is provided by a transducer, such as an accelerometer 10 which may be any one of a variety of well-known servolinear accelerometers with a single sensing axis. Preferably, the accelerometer is provided with a mount which allow orienting it in any direction with respect to three axes of the mount. This permits measuring acceleration amplitudes in any desired direction. The output of the accelerometer 10 is fed to a summing network 12 so that the output of the accelerometer 10 may be offset by a given amount, such as to compensate for the earth's gravity, as described in more detail hereinafter. The summing network 12 feeds an ordinary buffer amplifier 14, the output of which may be selectively passed through any one of a plurality of low-pass filters 16 in dependence upon the setting of a filter input switch 18. The filters 16 are preferably dynamic filters employing operational amplifiers with feedback so as to provide linear low-pass filtering characteristics. The filter 16 may be bypassed by selecting a bypass line 19 through a suitable setting of the switch 18. The output of the filters 16 is passed through a high pass filter 20, unless the filter 20 is bypassed by a shunt switch 22, the function of which will be described more fully hereinafter. The high pass filter 20 and switch 22 are connected to an amplifier 24 which provides a linear, absolute value representation of its input voltage. The amplifier 24 comprises a linear full wave rectifier of a well-known type. This circuit may be of the type illustrated in part II of Philbrick's book: Applications Manual for Computing Amplifiers for Modeling Measuring Manipulating and Much Else.

The absolute value of the analogue voltage being monitored, as possibly modified by the addition of an offset voltage into the summing network 12, and by the low-pass filters 16 and/or the high pass filter 20, is fed in common to a plurality of comparator circuits 26—31, some of which are broken away herein for simplicity. Each of the comparator circuits is also responsive to a corresponding voltage reference which identifies the voltage limit to which the comparator is to be responsive. Each of the voltage references comprises a potentiometer 34—36, some of which are broken away herein for simplicity. The potentiometers 34—36 are connected to a reference voltage supplied by a power supply circuit 38 which in turn is powered by any suitable source 40 of electrical power, such as conventional 60 Herz AC. Each of the comparators 26—31 is of a well-known type, and will provide an output whenever the voltage supplied thereto from the absolute value amplifier 24 is in excess of the respective voltage supplied thereto from one of the potentiometers 34—36. The output of each comparator 26—31 is connected to a respectively corresponding monostable multivibrator or single shot 46—51, each of which has the well-known characteristic that upon receipt of an input signal, it will immediately generate an output signal, but that no further output signals can be generated until the input signal disappears and then reappears. Thus, for each output initiated from one of the comparators, there will be but one output from the related one of the single shots 46—51. The output of each of the single shots is used to drive a corresponding register or counter, such as electromechanical counters 52—57. In the particular embodiment of the invention being described with respect to FIG. 1, it is assumed that the analogue voltage being monitored represents the output of an accelerometer, and as described in the introductory sections hereinbefore, that this accelerometer is measuring ride qualities on a vehicle. In such a case, the frequency response of this system is adequate at around 10 Herz, or more. Thus, relatively inexpensive rotary electromechanical counters of a well-known type may be utilized. On the other hand, it will be understood that in an embodiment requiring a higher speed of response, suitable electronic accumulators, counters or registers might be utilized to receive the outputs of the single shots 46—51 and maintain a count thereof.

In order to keep track of the period of time curing which the counters 52—57 have been responsive to accumulate counts indicative of amplitudes in excess of a given amount, another counter 58 may be utilized to record elapsed time by responding to a clock signal, such as the output of the 10 Herz square wave clock circuit 60. The clock circuit 60 may be jointly responsive to the power supply 58 and may derive its frequency stability directly from the power source 40.

The input to the summing network 12 which can be used to offset the analogue input voltage (such as from accelerometer 10) may be conveniently derived from a potentiometer 62 which is connected to another voltage reference 63 in the power supply 38. Of course, the power supply 38 will supply suitable power to the remaining circuitry of FIG. 1.

Figure 2:
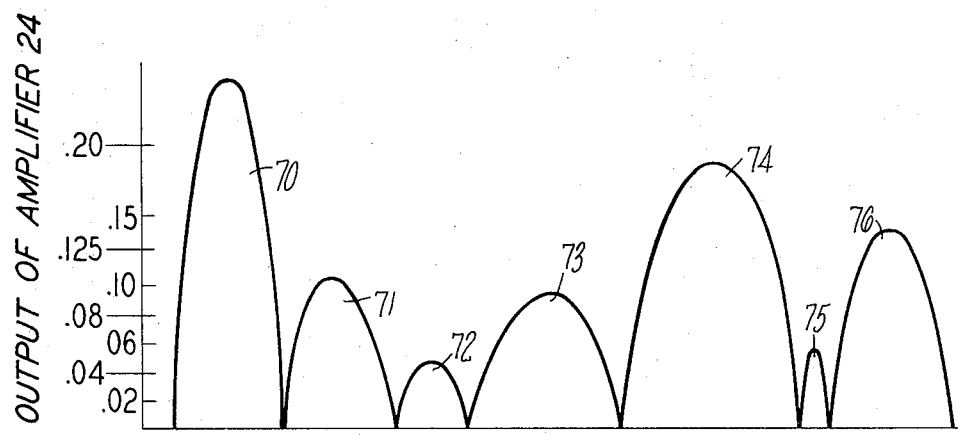
FIG. 2 is a diagram illustrative of the operation of the circuit of FIG. 1 in response to an analogue input voltage.

The operation of this embodiment of the invention is illustrated in FIG. 2. Therein, a typical output of amplifier 24 is plotted; notice that the analogue voltage has been rectified and so all of the amplitudes are in a given direction (shown herein to be the positive direction). Below the output of amplifier 24 are plotted the on-times of the single shots 46—51, beneath which is an indication of counts set in the related counters 52—57. For purposes of illustration herein, the counters 52—57 are taken to relate to various accelerations equivalent to fractions of gravitational force, and have arbitrarily been graduated in amounts shown at the left of FIG. 2, and also shown within the counters 52—57 in FIG. 1. It will be seen that each of the components 70—76 of the exemplary wave form in FIG. 2 has a sufficient amplitude so as to operate three single shots 49—51 thereby causing a count to be set in their respective counters 55—57. However, the components 72 and 75 of the wave form are not sufficient to operate any of the single shots relating to comparators set to compare for higher voltages than comparator 29. Thus, no counts are established in counters 52—54 as a result of the wave form components 72—75. Similarly, component 74 is of a sufficient amplitude to cause a count in each of the counters except the counter 52, and component 70 is of sufficient amplitude to operate all of the comparators and thus cause a count in every one of the counters.

FIG. 2 illustrates the utilization of the first embodiment of the present invention, which is to record the number of times that an amplitude in excess of a reference amplitude is sensed in the analogue wave form. Analysis of the counts set in the various counters is an indication of the occurrence of various amplitudes within the analogue wave form, although the various times at which the various amplitudes were sensed are not, of course, indicated by the counters.

Figure 3:
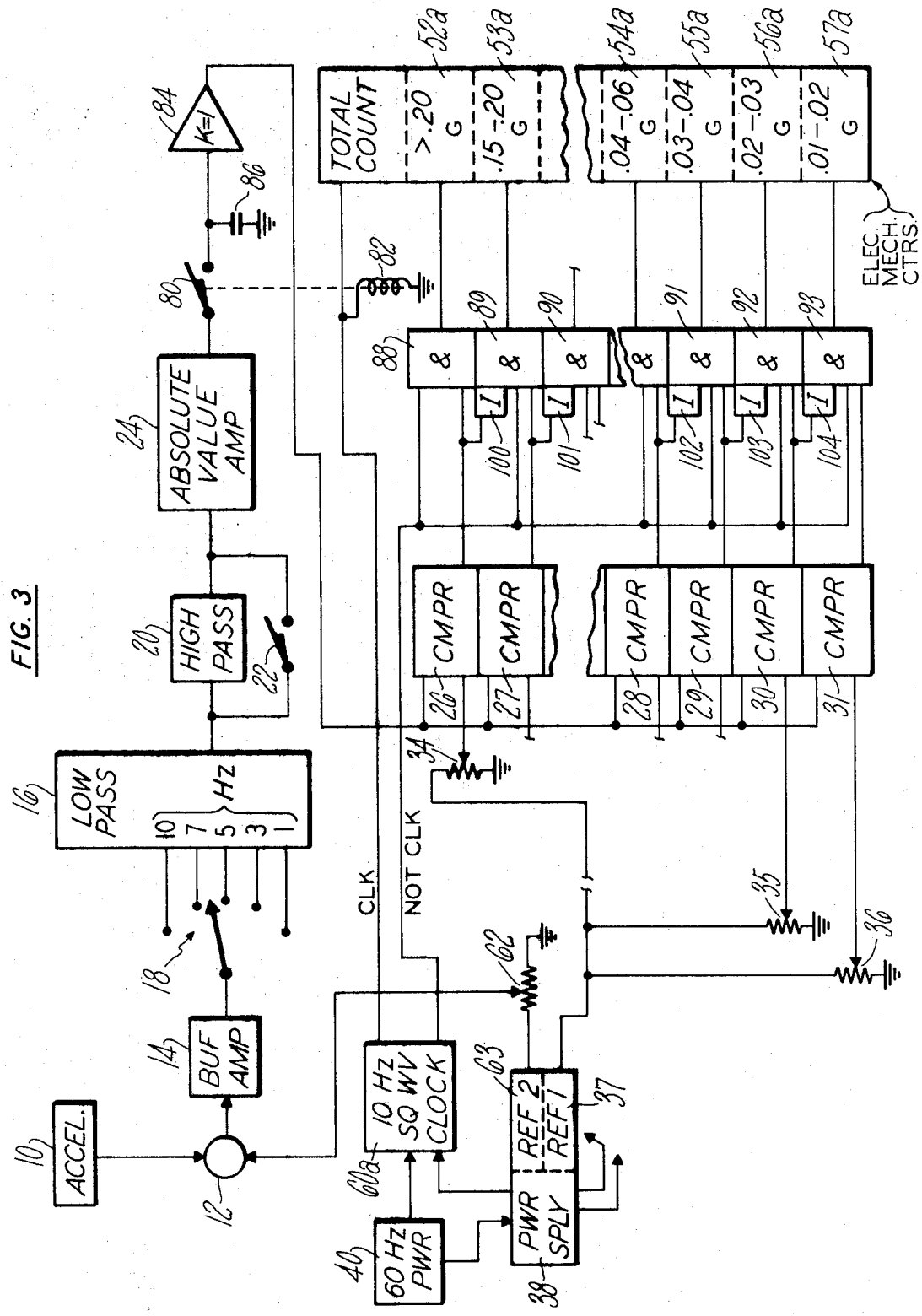
FIG. 3 is a schematic block diagram of a second embodiment of the present invention in which the time distribution of occurrences of analogue voltage amplitudes within various ranges are monitored.

A second embodiment of the invention is illustrated in FIG. 3, wherein those components which serve exactly the same function as in the embodiment of FIG. 1 bear the same reference numerals, and components of the same type serving a similar function bear reference numerals with subscript "a." Portions of the embodiment of FIG. 3 which differ from that of FIG. 1 bear higher reference numerals.

In the embodiment of FIG. 3, the output of the absolute value of amplifier 24 is fed to a normally open contact 80 which is closed by current passing through a solenoid 82. The solenoid 82 is operated in response to the in-phase component (called clock or CLK) from the 10 Herz square wave clock 60a. The clock signal is illustrated at the top of FIG. 4. Whenever the contact 80 is closed, then an operational amplifier 84 (which may have a gain of one), follows the output of the amplifier 24, as does a shunt input capacitor 86. However, when the clock signal is absent (during not clock time, as seen at the top of FIG. 4) the contact 80 is open and the last voltage applied to the capacitor and amplifier 84 will be maintained through the amplifier 84 as a result of the capacitor 86. Of course, the capacitor 86 must be large and the input e impedance to the amplifier 84 must be relatively high in order to maintain the charge in the capacitor 86 substantially constant during not clock time.

The output of the amplifier 84 is fed to the the comparator circuits 26—31, which each supply an output whenever the input wh thereto from the amplifier 84 is in excess of the amplitude of a voltage reference derived from a related potentiometer 34—36. The comparator circuits follow the output of amplifier 84 at all times, but any output from one of the comparator circuits 26—31 can be utilized only when the contact 80 is open and the voltage is fixed by capacitor 86, due to the utilization of a plurality of AND circuits 88—93, some of which are broken away for simplicity herein. These AND circuits can operate only when the compliment to the clock signal (NOT CLK) is available as illustrated in FIG. 4. Each of the AND circuits 88—93 operates a corresponding counter 52a—57. In this embodiment, the counters are understood to indicate ranges of acceleration calibrated in fractions of gravitational force, such as 0.01 g. through 0.02 g. being monitored by the counter 57a. In order to cause the counters to respond only when an amplitude falls within a given range, each of the AND circuits 89—93 has an inverter 100—104 at the input thereof which prevents the AND circuit from operating if the amplitude is sufficiently high to cause operation of the next higher comparator. For instance, if the voltage amplitude from amplifier 84 is sufficiently high to cause operation of comparator 27, then AND circuit 89 will operate unless the amplitude is also high enough to permit operation of comparator 26, in which case the related inverter 100 will have an input and therefore no output, thus blocking the operation of the AND circuit 89. In that case, instead of the counter 53a receiving a signal, the counter 52a will receive a signal indicating that the magnitude is higher than 0.20 g. In a similar fashion, each of the inverters 100—104 limits the operation of a related AND circuit 89—93 to the case where the amplitude is as high as the related comparator but not high enough for it to operate the next higher comparator in the sequence.

Operation of this embodiment of the invention is illustrated in FIG. 4, wherein the same analogue wave form is plotted as is plotted in FIG. 2. The effect of the solenoid and switch combination 80, 82 along with the capacitor 86 is illustrated in FIG. 4. Thus, during clock time, the output of amplifier 84 follows the output of amplifier 24; but when the switch contact 80 is open (during not clock time), then the voltage remains where it was at the end of clock time so as to permit sampling of the voltage by the AND circuits 88—93. It should be understood that the sampling is done on a clock time basis, rather than on the basis of occurrence of major components of the analogue voltage. Thus, the sampling is completely random with respect to the analogue voltage, and it therefore has meaning only when sufficient number of samples are taken so as to give a statistical probability that the magnitude sensed in this random fashion bares a time relationship to the actual time relationship of magnitudes which occurred in the analogue wave form being analyzed. The embodiment of FIGS. 3 and 4 differs from that of FIGS. 1 and 2 in that only one counter will be set during each of the sampling times, in dependence upon the range of magnitude which the voltage on the capacitor 86 during the sampling time. It does not relate to the maximum amplitude of a wave form which may in fact be occurring at that time. As a matter of fact, the component 75 of the analogue wave form is never even sensed by any portion of the circuit beyond the amplifier 24 due to the fact that it occurs entirely within a period of time when switch contact 80 is open. After a sufficiently long sampling time, the behavior of an analogue voltage (such as the output of an accelerometer in a vehicle ride monitoring device) can be presumed to have characteristics of amplitude indicated by the settings of the counters. By viewing the counters after a long sampling time, it is determined that various numbers of occurrences of analogue voltage amplitudes within the respective ranges of amplitude have occurred, based on the statistical assumption that the random sampling of the capacitor voltage during not clock time will provide, over a period of time, an indication of the amplitudes involved and their time distributions.

The embodiment of the invention shown in FIGS. 3 and 4 has in fact been found to provide a sufficiently accurate indication, based on random sampling, of the distribution of amplitude occurrences in an analogue voltage.

Because of the interconnection of the AND circuits 88—93, the inverters 100—104, the voltage comparators 26—31 and the not clock signal from the clock 60a, one of the counters 52a—57 will be advanced by one count during each clock cycle unless there is no acceleration having a magnitude at least equal to 0.01 g. The total number of counts made is registered by another electromechanical counter 58a which is driven once in each clock cycle by the clock signal. Of course, this counter could be driven equally well by the not clock signal, but a simplification in power requirements is achieved by avoiding having either of these signal lines (CLK, NOT CLK) drive two counters at one time.

Because of the fact that the accelerometer 10 may preferentially be located with its sensitive axis aligned so as to have a vertical component and because of the fact that the accelerometer has a DC component in its output even when it is not measuring vertical accelerations, apparatus in accordance with the present invention provides for the subtracting the DC component by means of the introduction to the summing network 12 of a voltage from the potentiometer 62 which is fed by the second reference voltage portion 63 of the power supply 38. Thus, a voltage can be introduced into the summing network 12 which is the exact opposite of the normal DC output of the accelerometer when not oriented in the direction of gravity, or it may be increased to also compensate and subtract the voltage equal to the force of gravity on the accelerometer when its orientation is such as to include a vertical component. If desired, the potentiometer 62 may be set to its extreme right-hand position as shown in FIGS. 1 and 2 so as to permit operation of the apparatus without any DC offset compensation. Switch 22 should then be opened. This is particularly advantageous in cases where two units in accordance with the present invention are both being operated simultaneously, one with compensation for DC output of the accelerometer with switch 22 closed and one without it. This may provide indications of the suitability of a given degree of banking on a curve at various speeds when evaluating a roadbed.

The low-pass filters 16 provide a means for separating higher frequency motion from various degrees of lower frequency motion so as to provide an indication related to the irritation effect upon passengers of lower frequency motion in a vehicle. Of course, this feature can be eliminated if desired in any given implementation of the present invention.

The high pass filter 20 may be utilized to eliminate extremely low frequency motion components, and my may for instance have a cutoff frequency on the order of tenths of a Herz. This may preferably comprise a passive integrating type of high pass filter employing a very large series capacitance and shunt resistance. The high pass filter 20 also is operative to remove DC components from the accelerometer output. Thus, the apparatus herewith may be operated without DC voltage compensation at the summing network 12, when the high pass filter is engaged by leaving the shorting switch 22 open. On the other hand, since the high pass filter 20 removes all DC components, the setting of the potentiometer 62 and therefore the input to summing network 12 is immaterial whenever the high pass filter is in circuit by means of the shorting switch 22 being opened.

The foregoing description has been given in terms of one utilization of either of the embodiments of the present invention, to wit: the analysis of vehicle ride characteristics as a result of the analogue voltage being analyzed coming from an accelerometer capable of measuring acceleration rates to which passenger comfort relate. However, it should be understood by those skilled in the art that any transducer-generated, or other analogue voltage may be analyzed by the invention. Also, the voltage references may be adjusted as desired by adjusting potentiometers 34—36, and that the counters can count occurrences of amplitude of any given analogue voltage applied to the summing network 12. Further, the filtering and the offset voltage applied to the summing network 12 may be utilized to suit the needs of analysis of any given analogue voltage wave form with which the present invention may be utilized. Thus, although the invention has been shown and described with respect to preferred embodiments thereof, it should be understood by those skilled in the art that the foregoing and various other changes and omissions in the form and detail thereof may be made therein without departing from the spirit and the scope of the invention.

CLAIMS

Having thus described typical embodiments of our invention, that which we claim as new and desire to secure by Letters Patent of the United States is:

We claim:

1. Analgoue voltage amplitude analysis apparatus comprising:

clock means alternately providing first and second signals respectively defining first and second periods of time, cyclically in a sequence;

means providing a plurality of voltage references;

input means providing the absolute value of an analogue voltage, the amplitude characteristics of which are to be analyzed;

storage means responsive to said clock means and said input means for responding to said input means during a period of time commensurate with a first one of said clock signals and for storing during the period of time commensurate with said second clock signal said absolute value of analogue voltage last sensed during said first clock signal;

a plurality of voltage comparison means, each responsive to said storage means and to a related one of said voltage references, each providing an output signal in response to the voltage output of said storage means being in excess of the voltage of the corresponding voltage reference, said comparison means arranged in a sequence of ascending order of voltage of the related voltage references;

a plurality of gate means, one for each of said comparison means, each connected to the output of the related comparison means, each responsive to the second one of said timing signals and each except the highest one in said sequence being responsive to the absence of an output from the one of said comparison means next higher in said sequence thereto, to provide an output signal; and a plurality of counters, one related to each of said compare means, each responsive to the output signal of the related gate means to increment the count thereof in response to each output signal of the related gate means, whereby each of said counters counts the incidence of signals presented to said store means having a voltage amplitude as high as the related voltage reference but not as high as the next higher reference in said sequence.

2. The apparatus according to claim 1 wherein said source means includes means for adding a DC voltage of a determinable amount and sense to said analogue voltage, whereby said means offsets the average value of said analogue voltage.